Apr. 10, 1923.
S. MUNSON
TRACTOR SPREADER
Filed Jan. 11, 1921
1,451,627
3 sheets-sheet 2
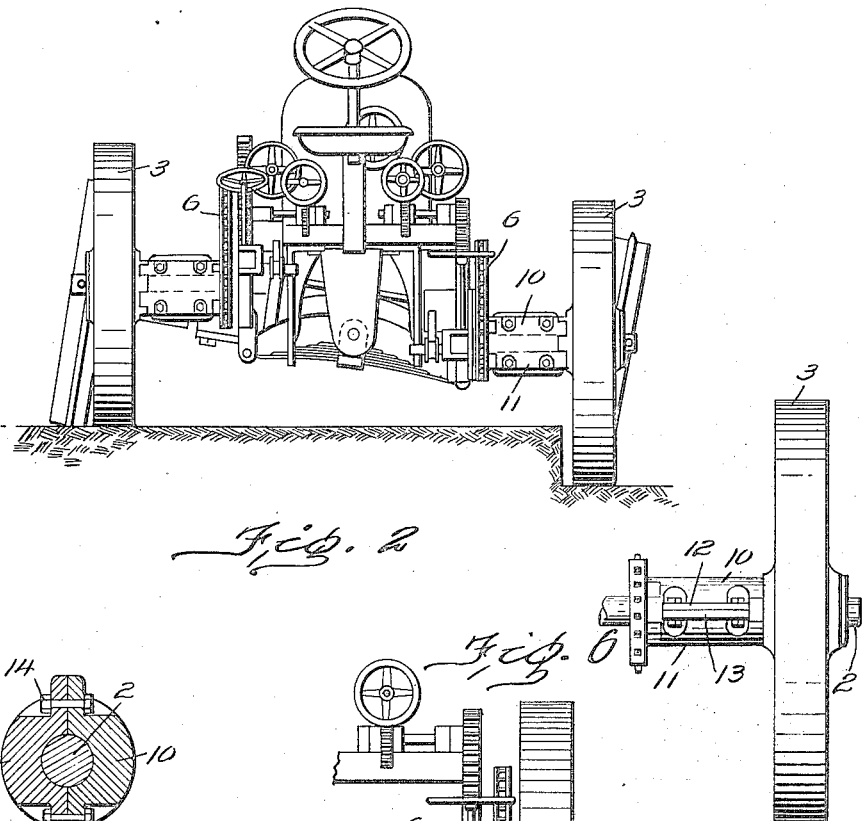
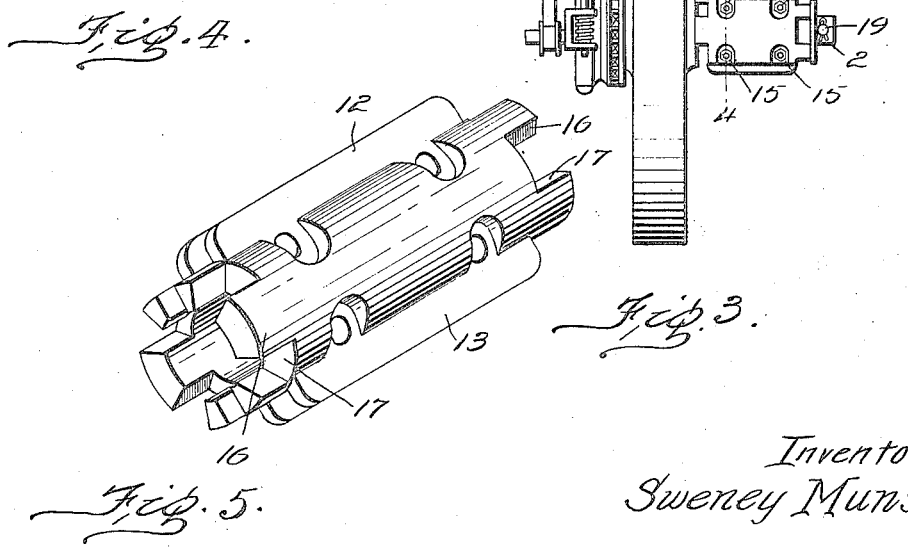
Inventor
Sweney Munson
By Geo. P. Kimmel
Attorney

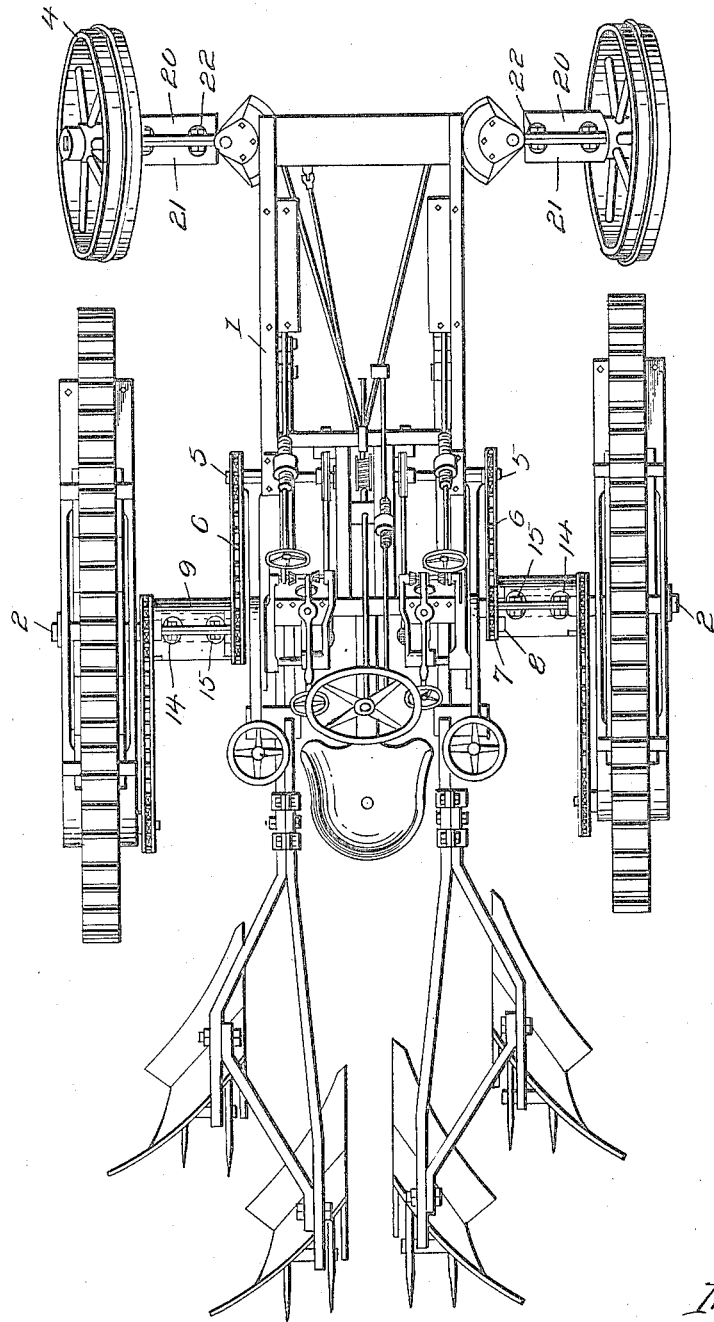

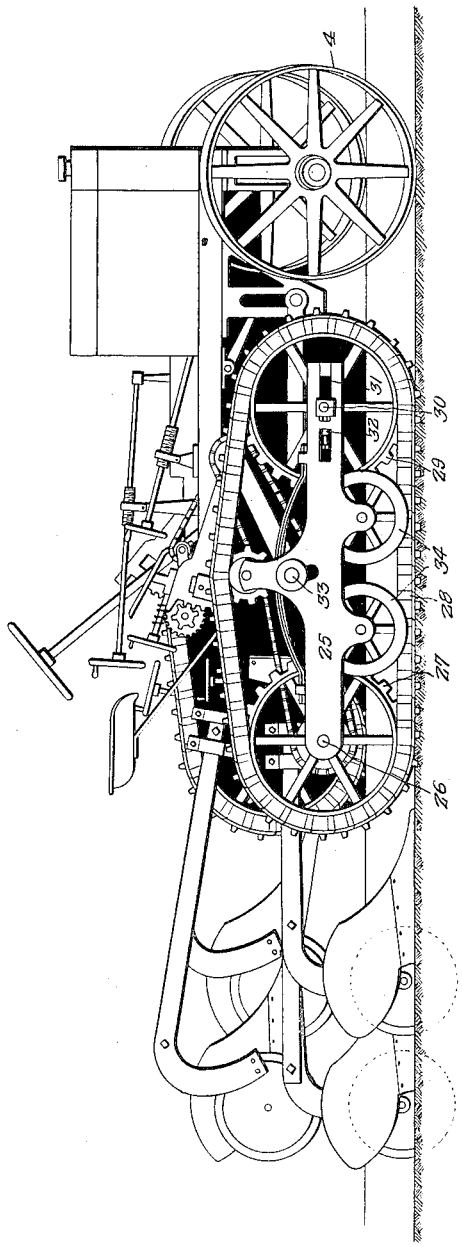

Patented Apr. 10, 1923.

1,451,627

UNITED STATES PATENT OFFICE.

SWENEY MUNSON, OF FOWLER, COLORADO.

TRACTOR SPREADER.

Original application filed May 13, 1920, Serial No. 381,065. Divided and this application filed January 11, 1921. Serial No. 436,548.

*To all whom it may concern:*

Be it known that I, SWENEY MUNSON, a citizen of the United States, residing at Fowler, in the county of Otero and State of Colorado, have invented certain new and useful Improvements in Tractor Spreaders, of which the following is a specification.

This invention relates to improvements in spreading devices for tractors, and particularly to that class of tractors described in my copending application, Serial No. 381,065, filed May 13, 1920, of which this application is a division.

The primary object of this invention relates to a new and improved spreader device for tractors which is adapted to be removably mounted on the stub axles of said tractor, whereby the main ground supporting wheels may be adjusted with respect to the frame of the tractor.

One of the objects of the invention is the provision of a spreader device adapted to cooperate with the sprocket wheel mounted on the stub axle of a tractor, and means whereby the traction means may be adjustably mounted with respect to the body of the tractor.

A still further object of the invention is the construction of a spreader adapted to cooperate with a driven sprocket wheel and the traction mechanism of the tractor, permitting the said mechanism to be easily and readily adjusted to different distances with respect to the frame of the tractor, said spreader being adapted to cooperatively engage with the sprocket in one of its positions.

Another object of the invention is directed to a spreading device of universal application with various types of traction mechanism whereby the same may be adjusted, removed or replaced in various positions depending on the soil in which the tractor is to be used.

A still further and very important object of the invention will be found in the construction of a spreading device permitting the mounting and adjustment of the usual bull type or crawler tractor supporting wheels thereon so that the tractor may be used as efficiently in soft or muddy ground as in dry, sandy or loose soil.

With these objects in view and others which will be manifest and suggested as the nature and purpose of my invention are revealed in the following specification and drawings, wherein I have shown a practical yet preferred embodiment thereof.

Figure 1 is a plan view of the tractor showing the invention applied.

Fig. 2 is a rear elevation of the same with the plowing implement removed.

Fig. 3 is a fragmentary view showing one of the adjustments of the ground wheel.

Fig. 4 is a section taken on the line 4—4 of Fig. 3.

Fig. 5 is a perspective view of the spreading device detached.

Fig. 6 is a similar view to Fig. 3, taken in another position of the ground supporting wheel and spreader.

Fig. 7 is a side elevation of a crawler type of tractor wheel adapted to be used in connection with the spreader.

Referring now to the drawings, wherein similar numerals in the specification designate like and corresponding parts throughout the several views, I have shown my invention as applied to a tractor of the type set forth in my copending application above identified, having the usual frame 1 and power operating means for communicating motion to the tractor mechanism 3, mounted for rotation on the stub axles 2, said frame having the usual front, flanged supporting wheels 4 as shown in detail with the usual sprocket wheels and chains 6 which are trained about sprocket wheels 7 mounted on the said stub axles, each of said last mentioned sprocket wheels each being provided with clutch teeth 8 which cooperate with the spacing sleeve or spreader hereinafter to be referred to. The above mechanism thus affords a simple and efficient driving connection for the ground supporting wheels for the tractor and spreaders which as shown are mounted on opposite sides of the machine, now to be described in detail.

The spacing sleeves or spreaders 8, 9, each consist of complementary semi-circular sections 10, 11 adapted to embrace the stub axles, said sections being provided with flanges 12, 13 which are apertured to receive connecting and locking elements 14, 15, securely retaining the respective sections on the shaft. Referring in particular to Fig. 5 of the drawing, showing a detached sectional spreader, it will be noted that each section is designed to provide end teeth 16 and notches 17 which are adapted to cooperate with the teeth on the respective sprocket wheel 7 and the hub 18 of each ground wheel. By this construction, it will be seen that in order to narrow the tread of the machine, the sleeves or spreaders may be removed and the ground wheels moved inwardly, in which position the teeth of the sprocket wheel interlock with the hub of the ground wheels clearly shown in Fig. 3 of the drawing. The spreaders may then be positioned on the axle outside of the ground wheel and be loosely retained by a suitable fastening element passing through the aperture 19 in the end of said stub axle.

The front wheel spindles are also provided with removable spreaders 20, 21 which are retained by suitable fastening elements 22, constructed similarly to the sleeves above referred to, but in this instance are not provided however with the end teeth. In the above construction, it will be seen that I have provided a novel and highly efficient spreading device with provision for accommodating various types and styles of interchangeable wheels, so that the tractor is capable of use in soft, muddy or soggy ground, and also on hard or sandy roads. In other words, the spreading device feature of my invention has the two-fold object of accommodating either the bull type or crawler type wheels, thus rendering the same capable of use under all conditions of soil and as a road machine when so desired, it being understood that when the road or ground is hard it is most economical to use a bull wheel, as it will stand the wear better in dry dust than the crawler wheel. This adjustment from one type of wheel to another may be easily made expeditiously and without material labor or longer time, the tractor having its advantages of being capable of universal use under all soil or climatic conditions.

From the above construction taken in connection with the drawings, it will be readily apparent that I have provided a novel and highly efficient spreading device adapted to be readily secured to and removable from a drive shaft or stub axle of a tractor embodying certain features for cooperative engagement with the bull wheels or crawler type wheels now universally in use in connection with various types of tractors and which has been found very practical and highly efficient in use, extremely simple and rigid in construction, inexpensive to manufacture, and of universal application.

In the form of the invention shown particularly in Fig. 7 wherein is disclosed a crawler type of tractor, each crawler comprises a horizontal, longitudinally extending frame 25, having rotatably mounted therein a horizontal shaft 26, to which is secured a large sprocket 27 over which is trained a track laying chain belt 28, said belt being also trained over a front, large sprocket wheel 29. The sprocket wheel 29 is mounted for rotation on a transverse shaft 30, longitudinally adjustable in slots 31 in the frame by adjusting screws 32 as clearly shown on the drawing. Each frame is also supported substantially medially thereof on a horizontal stud or axle 33 and is provided with two peripherally grooved wheels 34 rotatably mounted in the frame and which run upon the belt 28 in the manner more specifically set forth in my parent application above identified.

In the accompanying drawings, I have illustrated my invention embodied in one form by way of example, and which in practice has been found to be highly satisfactory in obtaining the desired results. It will be obvious however that other embodiments may be adopted, and that various changes in the details of construction may be resorted to by those skilled in the art without departing from the spirit and scope of the invention. It is furthermore understood that the invention is not necessarily limited to the precise elements shown except in so far as such limitations are set forth in the matter being claimed.

Having shown and described my invention what I now claim as new and desire to secure by Letters Patent of the U. S. is as follows:—

1. In a tractor, an axle, a crawler supporting the axle and adjustable inwardly and outwardly thereon, a driving member rotatable on the axle, a driven member rotatable on the axle, said two members having means for being interlocked to each other, means for driving the driving member, means for driving the crawler from the driven member, and spacing means arranged for detachment and provided with means for establishing driving connections between the said members when the latter are spaced apart, substantially as set forth.

2. In a tractor, an axle, a crawler supporting the axle and adjustable inwardly and outwardly thereon, a driving member rotatable on the axle, a driven member rotatable on the axle, said two members having clutch teeth arranged to interlock the said two members with each other, a removable sleeve mounted on the axle and having means on its ends for respectively interlocking with the teeth of said two members, when the latter are spaced apart, means for rotating the driving member, and means for driving the crawler from the driven member, substantially as set forth.

3. In a tractor, an axle, a crawler supporting the axle and adjustable inwardly and outwardly thereon, a driving member rotatable on the axle, a driven member rotatable on the axle, said two members having means for being interlocked with each other, a sleeve encircling the said axle comprising two longitudinal members detachably secured to each other, the ends of the sleeve having means for being respectively interlocked with said driving and driven members, means for rotating the driving members, and means actuated by the driven member for driving said crawlers, substantially as set forth.

In testimony whereof I affix my signature hereto.

SWENEY MUNSON.